United States Patent
Ichimura et al.

(10) Patent No.: US 10,899,278 B2
(45) Date of Patent: Jan. 26, 2021

(54) VEHICULAR VISUAL RECOGNITION DEVICE

(71) Applicant: KABUSHIKI KAISHA TOKAI-RIKA-DENKI-SEISAKUSHO, Aichi (JP)

(72) Inventors: Reiya Ichimura, Aichi (JP); Suguru Fujisaki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/763,449

(22) PCT Filed: Oct. 12, 2018

(86) PCT No.: PCT/JP2018/038151
§ 371 (c)(1),
(2) Date: May 12, 2020

(87) PCT Pub. No.: WO2019/097917
PCT Pub. Date: May 23, 2019

(65) Prior Publication Data
US 2020/0298762 A1     Sep. 24, 2020

(30) Foreign Application Priority Data
Nov. 15, 2017 (JP) ................. 2017-219780

(51) Int. Cl.
*H04N 7/18* (2006.01)
*B60R 1/12* (2006.01)
(Continued)

(52) U.S. Cl.
CPC ................. *B60R 1/12* (2013.01); *B60R 1/06* (2013.01); *B60S 1/60* (2013.01); *H04N 5/2252* (2013.01);
(Continued)

(58) Field of Classification Search
CPC .. H04N 5/2252; H04N 5/22521; H04N 5/225; H04N 7/18; B60R 1/00; B60R 1/12; B60R 1/06; B60R 2001/1253; B60S 1/60
(Continued)

(56) References Cited

U.S. PATENT DOCUMENTS

2011/0266375 A1    11/2011  Ono et al.
2015/0210081 A1*   7/2015   Suzuki ................. B41J 2/17553
                                                              347/86

FOREIGN PATENT DOCUMENTS

JP    H03-284449 A    12/1991
JP    H03-284451 A    12/1991
(Continued)

*Primary Examiner* — Robert Chevalier
(74) *Attorney, Agent, or Firm* — Roberts Calderon Safran & Cole P.C.

(57) ABSTRACT

An electronic outer mirror device includes a camera to assist visual recognition by an occupant of a vehicle, a visor configured to house the camera, and a base configured to support the visor such that the visor is capable of moving. The electronic outer mirror device further includes a first tube that is provided on the base side and through which passes a fluid to be ejected onto the camera in order to secure a field of view of the camera. The electronic outer mirror device further includes a second tube that is provided on the visor side such that when the visor is positioned at a predetermined position with respect to the base a base side of the second tube is connected to the first tube so as to enable passage of the fluid from the first tube, and when the visor is positioned at a different position from the predetermined position with respect to the base the base side of the second tube is disconnected from the first tube.

6 Claims, 4 Drawing Sheets

(51) Int. Cl.
*H04N 5/225* (2006.01)
*B60R 1/06* (2006.01)
*B60S 1/60* (2006.01)

(52) U.S. Cl.
CPC .. *H04N 5/22521* (2018.08); *B60R 2001/1253* (2013.01)

(58) Field of Classification Search
USPC ................................ 348/148, 143, 149, 135
See application file for complete search history.

(56) References Cited

FOREIGN PATENT DOCUMENTS

| | | |
|---|---|---|
| JP | 2000-085474 A | 3/2000 |
| JP | 2012-037548 A | 2/2012 |

\* cited by examiner

VEHICULAR VISUAL RECOGNITION DEVICE

CROSS-REFERENCE TO RELATED APPLICATIONS

The present application is a U.S. National Phase of PCT/JP2018/038151 filed on Oct. 12, 2018, claiming priority under 35 USC 119 from Japanese Patent Application No. 2017-219780 filed Nov. 15, 2017, the disclosure of which is incorporated by reference herein.

TECHNICAL FIELD

The present invention relates to a vehicular visual recognition device.

BACKGROUND ART

Japanese Patent Application Laid-Open (JP-A) No. 2012-37548 discloses a vehicular visual recognition device (an onboard optical sensor device) including a camera to assist a vehicle occupant with visual recognition to the rear of the vehicle.

The vehicular visual recognition device disclosed in JP-A No. 2012-37548 includes a nozzle to jet cleaning liquid toward a lens of the camera. Snow or ice that has adhered to the camera lens can accordingly be removed by the cleaning liquid jetted through the nozzle.

However, there is a desire to reduce the size of vehicular visual recognition devices disposed at the outer side of a vehicle, while securing the field of view of a visual recognition section such as a camera for assisting a vehicle occupant with visual recognition.

SUMMARY OF INVENTION

Technical Problem

In consideration of the above circumstances, an object of the present invention is to obtain a vehicular visual recognition device that can be reduced in size, while securing the field of view of a visual recognition section to assist visual recognition by a vehicle occupant.

Solution to Problem

A vehicular visual recognition device according to a first aspect includes a visual recognition section configured to assist visual recognition by an occupant of a vehicle, a housing body configured to house the visual recognition section, a support body configured to support the housing body such that the housing body is capable of moving, a first fluid passageway that is provided on the support body side and through which passes a fluid to be ejected onto the visual recognition section in order to secure a field of view of the visual recognition section, and a second fluid passageway that is provided on the housing body side such that when the housing body is positioned at a predetermined position with respect to the support body a support body side of the second fluid passageway is connected to the first fluid passageway so as to enable passage of the fluid from the first fluid passageway, and when the housing body is positioned at a different position from the predetermined position with respect to the support body the support body side of the second fluid passageway is disconnected from the first fluid passageway.

A vehicular visual recognition device according to a second aspect is the vehicular visual recognition device of the first aspect, wherein when the housing body is positioned at a different position from the predetermined position with respect to the support body the support body side of the second fluid passageway is closed off by part of the support body.

A vehicular visual recognition device according to a third aspect is the vehicular visual recognition device of the first aspect or the second aspect, wherein in a state in which the support body side of the second fluid passageway is closed off by part of the support body when the housing body is positioned at a different position from the predetermined position with respect to the support body, a housing body side of the first fluid passageway is covered by part of the housing body.

A vehicular visual recognition device according to a fourth aspect is the vehicular visual recognition device of any one of the first aspect to the third aspect, wherein the support body includes a main support body and a support body cover configured to cover the main support body. A tube-shaped first connection portion to which the first fluid passageway is connected is provided to the support body cover, and a tube-shaped second connection portion to which the second fluid passageway is connected is provided to the housing body. The first connection portion and the second connection portion are disposed coaxially to one another when the housing body is positioned at the predetermined position with respect to the support body, and the second connection portion is disposed at a different position that is not coaxial to the first connection portion when the housing body is positioned at a different position from the predetermined position with respect to the support body.

A vehicular visual recognition device according to a fifth aspect is the vehicular visual recognition device of the fourth aspect, wherein a tube-shaped seal member is provided at a peripheral edge of the second connection portion of the housing body such that an end portion on the support body cover side of the seal member is configured to abut the support body cover.

A vehicular visual recognition device according to a sixth aspect is the vehicular visual recognition device of any one of the first aspect to the fifth aspect, wherein a foreign matter suppressing member is provided between the housing body and the support body in order to suppress ingress of foreign matter into the first fluid passageway.

Advantageous Effects of Invention

In the vehicular visual recognition device according to the first aspect, when the housing body is positioned at the predetermined position with respect to the support body, the passage of the fluid from the first fluid passageway into the second fluid passageway is enabled. The fluid is then ejected onto the visual recognition section through the first fluid passageway and the second fluid passageway in order to secure the field of view of the visual recognition section. When the housing body is positioned at a different position from the predetermined position with respect to the support body, the first fluid passageway and the second fluid passageway are not linked to one another. This prevents or suppresses constraints relating to the routing of the flow path through which the fluid passes, compared to configurations in which the first fluid passageway and the second fluid passageway are always linked to one another. The size of the vehicular visual recognition device can be reduced as a result.

In the vehicular visual recognition device according to the second aspect, when the housing body is positioned at a different position from the predetermined position with respect to the support body, the support body side of the second fluid passageway is closed off by part of the support body. The support body side of the second fluid passageway can thereby be closed off without providing another member to close off the support body side of the second fluid passageway.

In the vehicular visual recognition device according to the third aspect, in a state in which the support body side of the second fluid passageway is closed off by part of the support body, the housing body side of the first fluid passageway is covered by part of the housing body. This prevents or suppresses the housing body side of the first fluid passageway from being seen, thereby enabling a negative impact on the external styling of the vehicular visual recognition device to be prevented or suppressed.

In the vehicular visual recognition device according to the fourth aspect, the first fluid passageway is connected to the first connection portion of the support body cover, and the second fluid passageway is connected to the second connection portion of the housing body. Moreover, when the housing body is positioned at the predetermined position with respect to the support body, the first connection portion and the second connection portion are disposed coaxially to one another. This enables the fluid to pass from the first fluid passageway into the second fluid passageway. When the housing body is positioned at a different position from the predetermined position with respect to the support body, the second connection portion is disposed at a different position that is not coaxial to the first connection portion. The first fluid passageway and the second fluid passageway are thus no longer linked to one another. In this manner, the vehicular visual recognition device according to the fourth aspect enables the first fluid passageway and the second fluid passageway to be linked together through the first connection portion of the support body cover and the second connection portion of the housing body.

In the vehicular visual recognition device according to the fifth aspect, the tube-shaped seal member is provided at a peripheral edge of the second connection portion of the housing body such that the end portion on the support body cover side of the seal member abuts the support body cover. This enables the fluid to be prevented or suppressed from leaking out from between the first fluid passageway and the second fluid passageway.

In the vehicular visual recognition device according to the sixth aspect, the foreign matter suppressing member is provided between the housing body and the support body, thereby enabling the ingress of foreign matter to the first fluid passageway to be suppressed.

BRIEF DESCRIPTION OF DRAWINGS

FIG. 2 is a cross-section illustrating the electronic outer mirror device illustrated in

FIG. 1.

DESCRIPTION OF EMBODIMENTS

Figure 1:
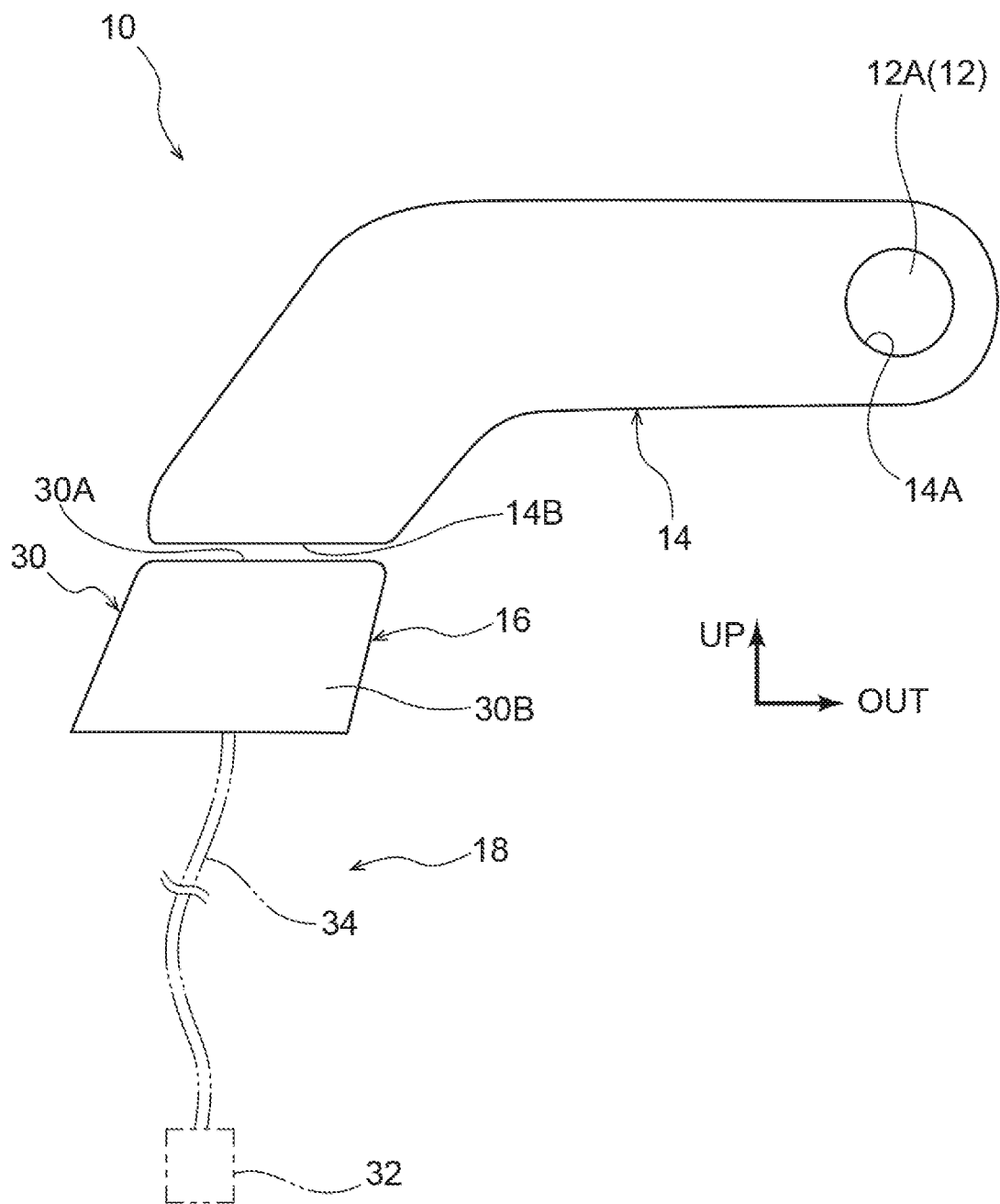
FIG. 1 is a side view illustrating an electronic outer mirror device.
Figure 2:
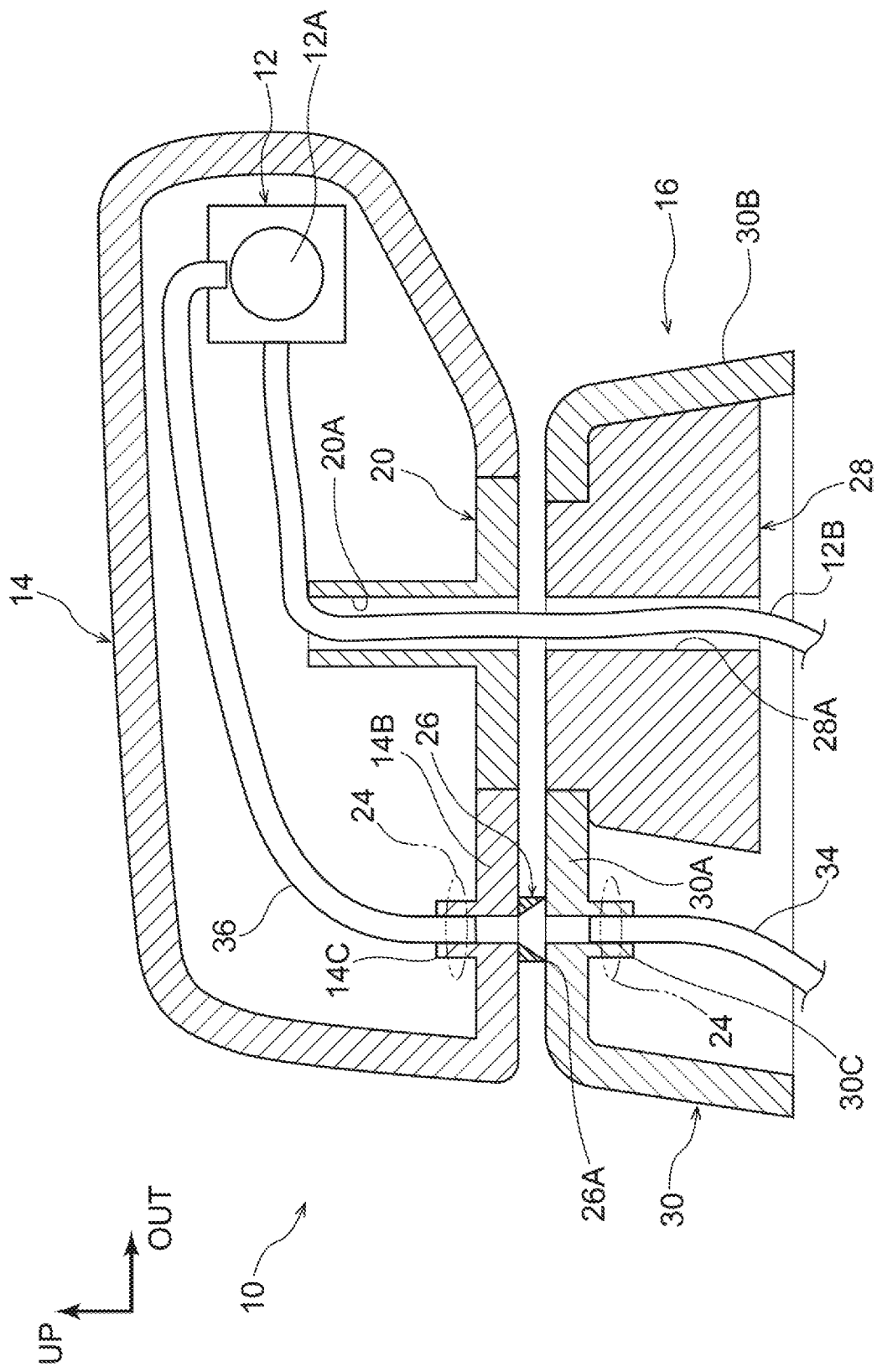
Figure 3:
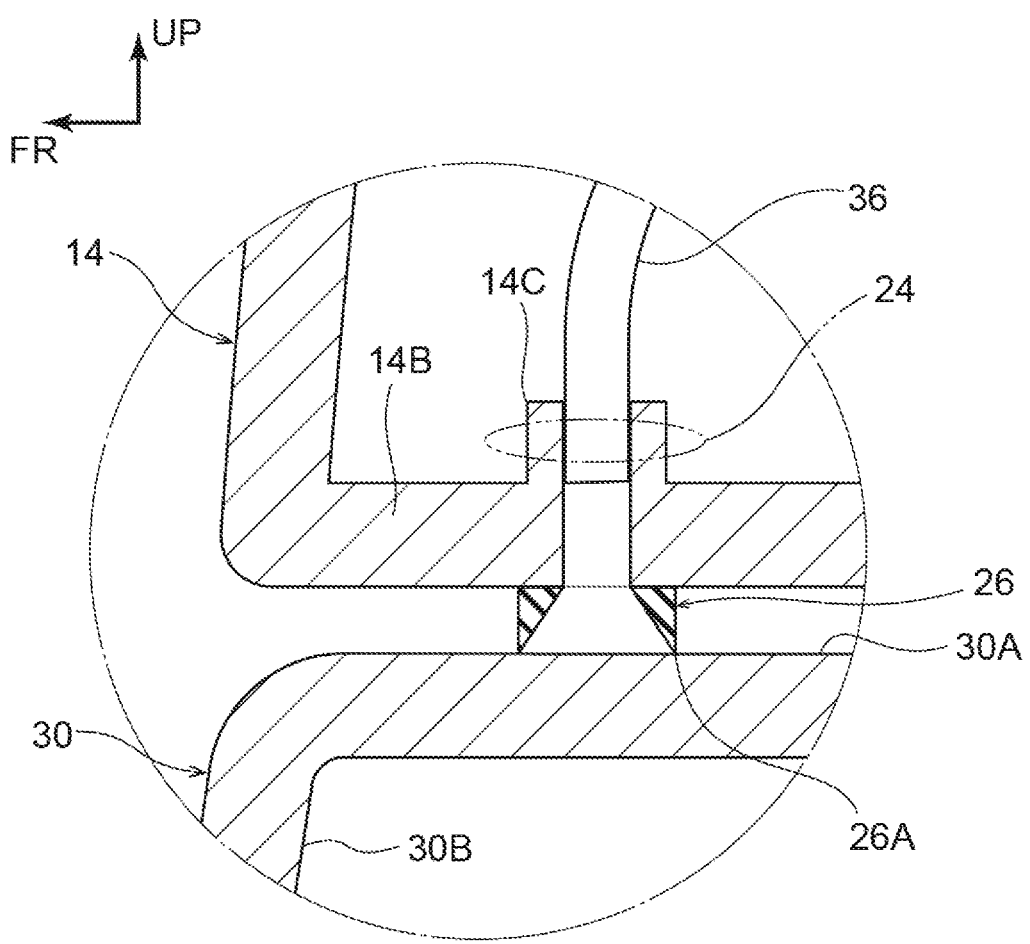
FIG. 3 is a cross-section illustrating a region between a visor and a base cover when positioned at a stowed position.

Explanation follows regarding an electronic outer mirror device, serving as a vehicular visual recognition device of the present invention, with reference to FIG. 1 to FIG. 3. Note that in the drawings, the arrow FR, the arrow OUT, and the arrow UP respectively indicate a vehicle front side, a vehicle width direction outside, and a vehicle upper side of a vehicle including the electronic outer mirror device, as appropriate. Unless specifically stated otherwise, simple reference to front, rear, up, and down directions in the below explanation respectively refers to front and rear in a vehicle front-rear direction, and up and down in a vehicle up-down direction.

An electronic outer mirror device 10 of the present exemplary embodiment illustrated in FIG. 1 is supported at an outer side of a front side door of a vehicle, not illustrated in the drawings. Images captured by a camera 12, serving as a visual recognition section, are displayed on a monitor provided inside the vehicle, and the electronic outer mirror device 10 thereby serves to assist visual recognition by an occupant of the vehicle. Specifically, the electronic outer mirror device 10 includes a visor 14 serving as a housing body that houses the camera 12, a base 16 serving as a support body that supports the visor 14 such that the visor 14 is capable of moving, and a foreign matter removal device 18 that secures the field of view of the camera 12 by removing foreign matter such as dust, snow, and ice that has adhered to a lens of the camera 12.

As illustrated in FIG. 1 and FIG. 2, the visor 14 is formed in a box shape and includes an internal space in which the camera 12 and so on are disposed. A circular exposing opening 14A is formed in the visor 14 on the opposite side of the visor 14 to a side supported by the base 16, described below. In a state in which the camera 12 is disposed inside the visor 14 and fixed to the visor 14, a lens 12A of the camera 12 is exposed through the exposing opening 14A.

As illustrated in FIG. 2, the base 16 side of the visor 14 is fixed to a stand 20. Note that a portion of the visor 14 surrounding a lower end of the stand 20 is referred to as a bottom wall 14B. The stand 20 is supported by the base 16 so as to be capable of moving (capable of swiveling) such that the visor 14 pivots in the front-rear direction with respect to the base 16. Note that the visor 14 may be pivoted with respect to the base 16 either electronically or manually. The state illustrated in FIG. 1 and FIG. 2 is a state in which the visor 14 is positioned at a neutral position. In this state, visual recognition of the oblique rear of the vehicle by the occupant of the vehicle is made possible by the camera 12 and the monitor. The visor 14 is disposed at a stowed position by pivoting the visor 14 with respect to the base 16. The visor 14 is suppressed from projecting out with respect to the front side door when in this state. A wiring insertion hole 20A through which wiring 12B of the camera 12 is inserted is formed in the stand 20.

As illustrated in FIG. 2, a tube-shaped second connection portion 14C that places the interior and the exterior of the visor 14 in communication with each other is provided to the bottom wall 14B, this being a portion of the visor 14 bordering the stand 20. A second tube 36, described later, is connected to one side of the second connection portion 14C. The other side of the second connection portion 14C is open toward the base 16. Note that a clamp member 24 is attached to the second connection portion 14C to prevent or suppress the second tube 36 from detaching from the second connection portion 14C.

A tube-shaped seal member 26 is attached to an outer side of the visor 14 at a peripheral edge of the second connection portion 14C. An end portion 26A of the seal member 26 on the side of a base cover 30, described later, abuts an apex wall 30A of the base cover 30. An internal diameter of the seal member 26 gradually decreases on progression from the base 16 side toward the visor 14 side. The seal member 26 thereby has a funnel shape that narrows on progression from the base 16 side toward the visor 14 side.

The base 16 is configured including a main base body 28 serving as a main support body, and the base cover 30 serving as a support body cover that is attached to the main base body 28 so as to cover the main base body 28. The stand 20 previously described is supported by the main base body 28 so as to be capable of swiveling. A wiring insertion hole 28A through which the wiring 12B of the camera 12 is inserted is formed in the main base body 28. The wiring 12B of the camera 12 is inserted through the wiring insertion hole 20A formed in the stand 20 and the wiring insertion hole 28A in the main base body 28, enabling the wiring 12B to be routed to the inside of the front side door.

The base cover 30 includes the apex wall 30A that is disposed opposing the bottom wall 14B of the visor 14 and extending substantially parallel to the bottom wall 14B, and side walls 30B that cover the main base body 28 from the sides. A tube-shaped first connection portion 30C that places the interior and the exterior of the base cover 30 in communication with each other is provided to the apex wall 30A. A first tube 34, described later, is connected to one side of the first connection portion 30C. Another side of the first connection portion 30C is open toward the visor 14. Note that a clamp member 24 is attached to the first connection portion 30C to prevent or suppress the first tube 34 from detaching from the first connection portion 30C.

In a state in which the visor 14 is positioned at the neutral position, the first connection portion 30C and the second connection portion 14C of the visor 14 are disposed coaxially to one another. The first tube 34 and the second tube 36 are thus linked together through the first connection portion 30C, the seal member 26, and the second connection portion 14C.

As illustrated in FIG. 3, in a state in which the visor 14 is positioned at the stowed position, the first connection portion 30C and the second connection portion 14C of the visor 14 are disposed on different axes to each other. The end portion 26A on the base cover 30 side of the seal member 26 is closed off by the apex wall 30A of the base cover 30 when in this state. The second tube 36 is thereby closed off on the base 16 side. In the state in which the visor 14 is positioned at the stowed position, an open end side (visor 14 side) of the first connection portion 30C (see FIG. 2) opposes the bottom wall 14B of the visor 14. Namely, the open end side of the first connection portion 30C is covered by the bottom wall 14B of the visor 14.

As illustrated in FIG. 1 and FIG. 2, the foreign matter removal device 18 includes a fluid supply section 32 that supplies a fluid such as washer liquid or warm air to be ejected onto the lens 12A of the camera 12. Note that a washer pump that conveys washer liquid under pressure, a blower motor that conveys temperature-controlled warm air under pressure, or the like may be employed as the fluid supply section 32. The foreign matter removal device 18 also includes the first tube 34, serving as a first fluid passageway that has one end connected to the fluid supply section 32 and another end connected to the first connection portion 30C of the base cover 30. The foreign matter removal device 18 further includes the second tube 36 serving as a second fluid passageway that has one end connected to the second connection portion 14C of the visor 14 and another end opposing the lens 12A side of the camera 12 so as to be disposed close to the lens 12A. The washer liquid, warm air, or the like is ejected through the other end of the second tube 36 toward the lens 12A of the camera 12, thereby enabling foreign matter that has adhered to the lens 12A of the camera 12 to be removed.

Operation and Advantageous Effects of Present Exemplary Embodiment

Explanation follows regarding operation and advantageous effects of the present exemplary embodiment.

As illustrated in FIG. 1 and FIG. 2, in the state in which the visor 14 is positioned at the neutral position, visual recognition of the oblique rear of the vehicle by the occupant of the vehicle is made possible by the camera 12 and the monitor.

Note that when the foreign matter removal device 18 is manually or automatically actuated when foreign matter has adhered to the lens 12A of the camera 12, a fluid such as washer liquid or warm air is supplied from the fluid supply section 32. The fluid such as washer liquid or warm air supplied from the fluid supply section 32 passes through the first tube 34, the first connection portion 30C of the base cover 30, the seal member 26, the second connection portion 14C of the visor 14, and the second tube 36, and is ejected onto the lens 12A of the camera 12. Foreign matter that has adhered to the lens 12A of the camera 12 is thereby removed.

As illustrated in FIG. 3, in the state in which the visor 14 is positioned at the stowed position, the end portion 26A on the base cover 30 side of the seal member 26 is closed off by the apex wall 30A of the base cover 30. The base 16 side of the second tube 36 is thereby closed off. Namely, in the state in which the visor 14 is positioned at the stowed position, the first tube 34 and the second tube 36 are not linked to one another. This prevents or suppresses constraints relating to the routing of the flow path through which the fluid passes, compared to configurations in which the first tube 34 and the second tube 36 are always linked to one another. The size of the electronic outer mirror device 10 can be reduced as a result. Moreover, in the present exemplary embodiment, there is no need to install glass to cover the lens 12A of the camera 12 or a heater to heat this glass, thereby enabling a further reduction in the size of the visor 14 at the peripheral edge of the camera 12. Moreover, there is no need to insert heater wiring through the wiring insertion hole 20A formed in the stand 20 and the wiring insertion hole 28A in the main base body 28 together with the first tube 34 and the second tube 36. This enables a reduction in the size of the stand 20 and the main base body 28.

Such a configuration in which the end portion 26A on the base cover 30 side of the seal member 26 is closed off by the apex wall 30A of the base cover 30 enables an increase in the number of components configuring the electronic outer mirror device 10 to be suppressed compared to cases in which a separate member is provided in order to close off the end portion 26A on the base cover 30 side of the seal member 26.

Furthermore, the internal diameter of the seal member 26 gradually decreases on progression from the base 16 side toward the visor 14 side, thereby enabling the contact surface area between the end portion 26A of the seal member 26 and the apex wall 30A of the base cover 30 to be reduced. This enables sliding resistance between the end portion 26A of the seal member 26 and the apex wall 30A of the base cover 30 to be reduced when the visor 14 pivots with respect to the base 16.

Moreover, in the present exemplary embodiment, the seal member 26 is provided between the base 16 and the visor 14, thereby enabling the fluid such as washer liquid or warm air to be suppressed from leaking out at the connection portion between the first tube 34 and the second tube 36. Note that in cases in which in which the only fluid that flows along the first tube 34 and the second tube 36 is a fluid that may be permitted to leak out at the connection portion between the first tube 34 and the second tube 36 (for example warm air), a configuration may be applied in which the seal member 26 is not provided.

Moreover, in the present exemplary embodiment, in the state in which the visor 14 is positioned at the stowed position, the open end side (visor 14 side) of the first connection portion 30C (see FIG. 2) opposes the bottom wall 14B of the visor 14. Namely, the open end side of the first connection portion 30C is covered by the bottom wall 14B of the visor 14. This prevents or suppresses the open end side of the first connection portion 30C, this being the portion to which the first tube 34 is connected, from being seen, thereby enabling a negative impact on the external styling of the electronic outer mirror device 10 to be prevented or suppressed.

Other Embodiment of Electronic Outer Mirror Device

Figure 4:
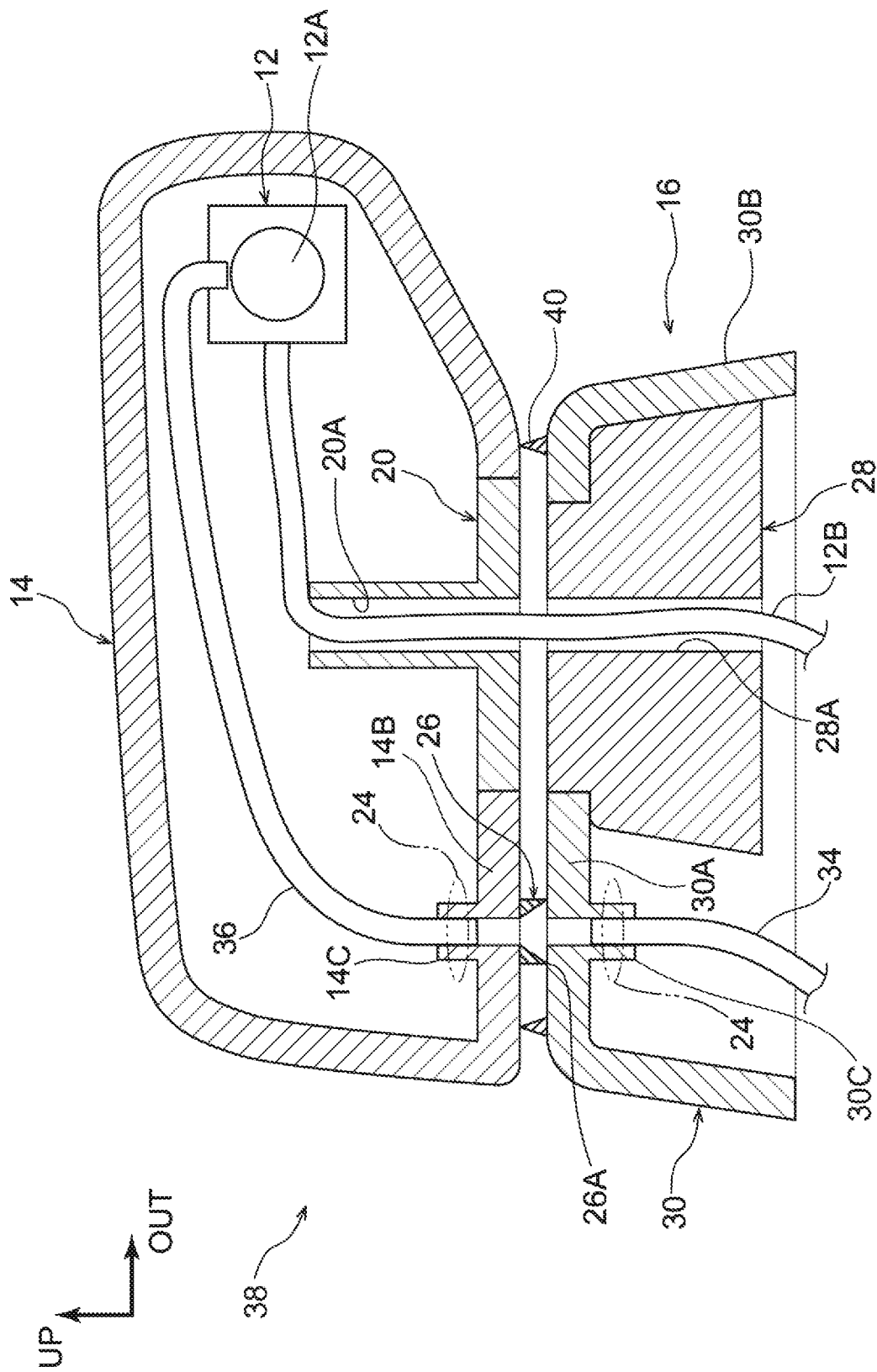
FIG. 4 is a cross-section corresponding to FIG. 2, illustrating an electronic outer mirror device of another embodiment.

Explanation follows regarding an electronic outer mirror device 38 of another embodiment, with reference to FIG. 4. Note that members and portions of the electronic outer mirror device 38 of the other embodiment that correspond to those of the electronic outer mirror device 10 described above are allocated the same reference numerals as the corresponding members and portions of the electronic outer mirror device 10, and explanation thereof is omitted.

As illustrated in FIG. 4, in the electronic outer mirror device 38 according to the other embodiment, a ring shaped lip member 40 serving as a foreign matter suppressing member is attached to an outer side of the base cover 30 configuring an outer peripheral portion of the apex wall 30A. An end portion on the visor 14 side of the lip member 40 abuts the bottom wall 14B of the visor 14. This configuration enables ingress of foreign matter into the first connection portion 30C and the first tube 34 though a gap between the visor 14 and the base cover 30 to be prevented or suppressed.

Note that although the camera 12 is given as an example of a visual recognition section in the electronic outer mirror devices 10, 38 described above, the present invention is not limited thereto. For example, the configuration of the present invention may be applied to another vehicular visual recognition device such as an outer mirror device including a mirror serving as a visual recognition section.

Moreover, fluid may be ejected through the first tube 34 onto a transparent cover that covers the lens 12A of the camera 12. Furthermore, in the state in which the visor 14 is positioned at the stowed position, an end portion on the visor 14 side of the first connection portion 30C may for example be closed off by a stopper portion provided to the bottom wall 14B.

Exemplary embodiments of the present invention have been described above. However, the present invention is not limited thereto, and obviously various other modifications may be implemented within a range not departing from the spirit of the present invention.

The entire content of the disclosure of Japanese Patent Application No. 2017-219780 filed on Nov. 15, 2017 is incorporated by reference in the present specification.

The invention claimed is:

1. A vehicular visual recognition device comprising:
a visual recognition section configured to assist visual recognition by an occupant of a vehicle;
a housing body configured to house the visual recognition section;
a support body configured to support the housing body such that the housing body is capable of moving;
a first fluid passageway that is provided at the support body side and through which passes a fluid to be ejected onto the visual recognition section in order to secure a field of view of the visual recognition section; and
a second fluid passageway that is provided at the housing body side such that: when the housing body is positioned at a predetermined position with respect to the support body, a support body side of the second fluid passageway is connected to the first fluid passageway so as to enable passage of the fluid from the first fluid passageway, and
when the housing body is positioned at a different position from the predetermined position with respect to the support body, the support body side of the second fluid passageway is disconnected from the first fluid passageway.

2. The vehicular visual recognition device of claim 1, wherein, when the
housing body is positioned at a different position from the predetermined position with respect to the support body, the support body side of the second fluid passageway is closed off by part of the support body.

3. The vehicular visual recognition device of claim 1, wherein,
in a state in which the support body side of the second fluid passageway is closed off by a part of the support body, when the housing body is positioned at a different position from the predetermined position with respect to the support body, a housing body side of the first fluid passageway is covered by a part of the housing body.

4. The vehicular visual recognition device of claim 1, wherein:
the support body includes a main support body and a support body cover configured to cover the main support body,
a tube-shaped first connection portion to which the first fluid passageway is connected is provided at the support body cover,
a tube-shaped second connection portion to which the second fluid passageway is connected is provided at the housing body,
the first connection portion and the second connection portion are disposed coaxially to one another when the housing body is positioned at the predetermined position with respect to the support body, and
the second connection portion is disposed at a different position that is not coaxial to the first connection portion when the housing body is positioned at a different position from the predetermined position with respect to the support body.

5. The vehicular visual recognition device of claim 4, wherein
a tube-shaped seal member is provided at a peripheral edge of the second connection portion of the housing body, and an end portion on a support body cover side of the seal member is configured to abut the support body cover.

6. The vehicular visual recognition device of claim 1, wherein
a foreign matter suppressing member is provided between the housing body and the support body in order to suppress ingress of foreign matter into the first fluid passageway.

* * * * *